United States Patent
Pugliese et al.

(10) Patent No.: US 12,316,402 B2
(45) Date of Patent: May 27, 2025

(54) BI-DIRECTIONAL COMMUNICATION THROUGH CAPACITIVE COUPLING IN WIRELESS DEVICES

(71) Applicant: Datalogic IP Tech S.r.l., Lippo di Calderara di Reno (IT)

(72) Inventors: Francesco Pugliese, Bologna (IT); Marco Pifferi, Predosa (IT)

(73) Assignee: Datalogic IP Tech S.R.L., Lippo di Calderara di Reno (IT)

( * ) Notice: Subject to any disclaimer, the term of this patent is extended or adjusted under 35 U.S.C. 154(b) by 648 days.

(21) Appl. No.: 17/586,338

(22) Filed: Jan. 27, 2022

(65) Prior Publication Data

US 2023/0239007 A1 Jul. 27, 2023

(51) Int. Cl.
| | |
|---|---|
| H02J 7/00 | (2006.01) |
| G06K 7/14 | (2006.01) |
| H02J 7/02 | (2016.01) |
| H02J 50/10 | (2016.01) |
| H02J 50/12 | (2016.01) |
| H02J 50/80 | (2016.01) |
| H04B 5/00 | (2024.01) |
| H04B 5/79 | (2024.01) |
| H04L 5/16 | (2006.01) |
| H04W 4/80 | (2018.01) |
| H04W 12/06 | (2021.01) |

(52) U.S. Cl.
CPC ............ *H04B 5/79* (2024.01); *G06K 7/1413* (2013.01); *H02J 50/10* (2016.02); *H02J 50/80* (2016.02); *H04L 5/16* (2013.01)

(58) Field of Classification Search
None
See application file for complete search history.

(56) References Cited

U.S. PATENT DOCUMENTS

| | | | |
|---|---|---|---|
| 5,572,441 A | 11/1996 | Boie | |
| 6,336,031 B1* | 1/2002 | Schyndel | H04B 13/00 340/870.37 |
| 7,684,868 B2* | 3/2010 | Tai | H04B 5/00 607/54 |
| 7,890,053 B2* | 2/2011 | Washiro | H04B 5/48 343/858 |
| 9,337,903 B2* | 5/2016 | Smith | H04B 5/266 |

(Continued)

FOREIGN PATENT DOCUMENTS

| | | |
|---|---|---|
| CN | 104335452 A | 2/2015 |
| CN | 105281803 A | 1/2016 |

(Continued)

OTHER PUBLICATIONS

Roberts et al., "A contactless transfer device for power and data", 1996 IEEE Aerospace Applications Conference Proceedings, 10.1109/AERO.1996.495936, Feb. 1996, # pages.

(Continued)

*Primary Examiner* — Tuan A Tran
(74) *Attorney, Agent, or Firm* — Shook, Hardy & Bacon

(57) ABSTRACT

A system and method for bi-directional communication through capacitive coupling is achieved with capacitive plates within the environment of a wireless power transfer (Continued)

system. Data is transferred using capacitance over a separate path from the transfer of electrical power in the wireless power transfer system.

20 Claims, 6 Drawing Sheets

(56) References Cited

U.S. PATENT DOCUMENTS

| | | | | |
|---|---|---|---|---|
| 9,590,699 | B1* | 3/2017 | Sankaran | H04W 4/80 |
| 10,141,979 | B2* | 11/2018 | Kim | H04B 5/79 |
| 10,284,026 | B2* | 5/2019 | Fukaya | H02J 50/80 |
| 10,397,966 | B1 | 8/2019 | Digiovanna | |
| 11,081,911 | B1* | 8/2021 | Nalbant | H04B 5/266 |
| 11,750,245 | B2* | 9/2023 | Shichino | H04B 5/45 |
| | | | | 307/104 |
| 11,955,810 | B2* | 4/2024 | Lee | A61N 1/37229 |
| 12,074,451 | B2* | 8/2024 | Zeine | H02J 50/20 |
| 2014/0049422 | A1 | 2/2014 | Von Novak et al. | |
| 2015/0137746 | A1 | 5/2015 | Lee et al. | |
| 2017/0063098 | A1 | 3/2017 | Jeong et al. | |
| 2019/0028149 | A1 | 1/2019 | Pifferi | |
| 2019/0372276 | A1 | 12/2019 | Kahlman | |
| 2021/0143673 | A1 | 5/2021 | Ahn et al. | |
| 2024/0007777 | A1* | 1/2024 | Sacha | H04R 25/609 |

FOREIGN PATENT DOCUMENTS

| | | |
|---|---|---|
| CN | 108702003 A | 10/2018 |
| CN | 110504991 A | 11/2019 |
| CN | 112701800 A | 4/2021 |
| CN | 112994753 A | 6/2021 |
| DE | 102020133178 A1 | 6/2021 |
| KR | 10-2021-0058042 A | 5/2021 |

OTHER PUBLICATIONS

Extended European Search Report received for European Patent Application No. 22217176.1, mailed on May 31, 2023, 12 pages.
Office action received for Chinese Patent Application No. 202211721246.9, mailed on May 16, 2024, 16 pages (9 pages of Original OA and 7 pages of English Translation).
Office action received for Chinese Patent Application No. 202211721246.9, mailed on Nov. 30, 2024, 16 pages (8 pages of Original OA and 8 pages of English Translation).

* cited by examiner

BI-DIRECTIONAL COMMUNICATION THROUGH CAPACITIVE COUPLING IN WIRELESS DEVICES

CROSS-REFERENCE TO RELATED APPLICATIONS

None.

BACKGROUND

Wireless Power Transfer (WPT) systems are formed by two main sections: transmitter (TX) and receiver (RX). The TX section (e.g., cradle) performs a power conversion from an electrical power source into an alternating current (AC) power signal with strict electrical characteristics (such as amplitude, frequency, etc.). The RX section (e.g. barcode reader) performs a power conversion from the AC power signal coming from the TX into a direct current (DC) power signal to be provided to a load. However, in order to perform a total contact replacement, there needs to be no physical link between the TX side and the RX side. There is a need to establish a bi-directional communication link between a barcode reader and the cradle that holds the barcode reader to pair the two together, to provide software updates to the barcode reader, and to send information in case of foreign object detection (FOD).

Additionally, there is a need to provide an alternative to inductive coupling to transfer power, or to transfer data (e.g. inter-chip or intra-chip) independently from the power transfer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present disclosure implement the use of capacitive coupling in a short-range bi-directional communication channel in a WPT system.

Embodiments of the present disclosure solve a problem, by bypassing conventional short-range communication protocols such as Bluetooth®, NFC® etc., and by having an auxiliary bi-directional communication channel, which may be established via plates that are capacitively coupled. These plates are placed in a charging device (e.g., cradle, charging pad, etc.) and a barcode reader (e.g., a handheld barcode reader, a mobile computer with barcode reading capabilities, presentation scanner, etc.) respectively, not necessarily aligned, and form the electrodes of a plate capacitor. Driving one of these plates with an electrical signal is possible to induce an electric-field variation that is detected by the other plate. A conditioning stage connected to the plates is possible to decode the transmitted signal.

The present disclosure arises from a need to perform a physical contact replacement in WPT systems, using a solution for bi-directional communication with the same performance as a wired connection. Embodiments of the present disclosure may achieve one or more of the following:

Protect an alternative short-range bi-directional communication solution for wireless charging devices;
Have a very low-cost solution (i.e. cost of two op-amps per plate);
Have a short-range communication channel that is totally independent of the wireless power channel, which allows a communication to be established even if there is no power transfer, such as during software updates or pairing;
Have a robust communication totally immune to metal objects (i.e. metal objects have a lattice formed by dipoles that are excited by the electric field variation);
Replace the physical layer of current communication protocols such as IrDA, in terms of speed and input/output electrical levels and connections;
Have a good misalignment performance;
Use the plates as presence sensors to activate presentation mode in a handheld scanner or to active pairing between the charging device and barcode reader; and
Performs a full duplex communication.

In a first aspect, a system and method of bi-directional communication through capacitive coupling in a wireless charging device includes a wireless power transfer (WPT) system. The WPT system includes a first transceiver with a transmitting capability and a second transceiver with a receiving capability. The WPT system includes a pair of capacitive plates positioned between the first transceiver and the second transceiver. A distance exists between a first capacitive plate and a second capacitive plate of the pair of capacitive plates. The first transceiver transmits an electrical signal to the first capacitive plate. The first capacitive plate and the second capacitive plate create a capacitance, which links the electrical signal from the first capacitive plate to the second capacitive plate. The electrical signal is received at the second transceiver from the second capacitive plate. A transfer of the electrical signal from the first transceiver through the first capacitive plate and from the second capacitive plate to the second transceiver occurs over a separate path from a transfer of electrical power from the first transceiver to the second transceiver.

In a second aspect, a barcode reader has both wireless charging capability and short-range data communication capability. The barcode reader includes a wireless power charging receiver coil that is configured to inductively couple with a corresponding wireless power charging transmitter coil in a charging device to perform a wireless power transfer therebetween. A capacitive plate is configured to capacitively couple with a corresponding capacitive plate in the charging device to perform short-range data communication therebetween, and this short-range data communication is independent of the wireless power transfer.

BRIEF DESCRIPTION OF THE DRAWINGS

The present disclosure is illustrated by way of example and not limitation in the accompanying figures in which like reference numerals indicate similar elements and in which.

DETAILED DESCRIPTION

The subject matter of aspects of the present disclosure is described with specificity herein to meet statutory requirements. However, the description itself is not intended to limit the scope of this patent.

In WPT systems, there is a need to establish a bi-directional communication between TX and RX sections. These WPT systems can include both power (WPT) and communication (data) on separate, independent channels. However, the communication channel may be realized on the same power channel via modulation techniques.

Embodiments of the present disclosure include a communication channel that is independent of the WPT channel, which may include plates that are capacitive coupled and set up as a short-range bi-directional communication in an WPT system. The shape of the plates (e.g., rectangular, circular, etc.) and the nature of the dielectric (e.g., air, plastics, etc.) are not specified because the present disclosure is based on the capacitive coupling physical phenomena, which can be formed between plates of different shapes and different dielectric materials.

Although various shapes can be used, for simplicity, in embodiments of the present disclosure, a parallel plate capacitor with an air gap dielectric is used to describe the capacitive coupling. The metal plates have a small surface area (e.g. mm$^2$), separated from each other approximately 10-20 mm. When electric energy is supplied to one plate of the capacitor, an electric field is set up between the two plates. The electric field sets up a displacement current between the two plates, and hence energy is transferred. Typically, only a small amount of energy is needed to transfer just the information. This transfer of information can be identified by the presence (e.g., logic level 1) or not (e.g., logic level 0) of the energy on the plates. This energy can be supplied directly by an input/output of a microcontroller, or provided by a dedicated driving stage in order to have a stronger electric field, which leads to a better capacitive coupling.

Figure 1:
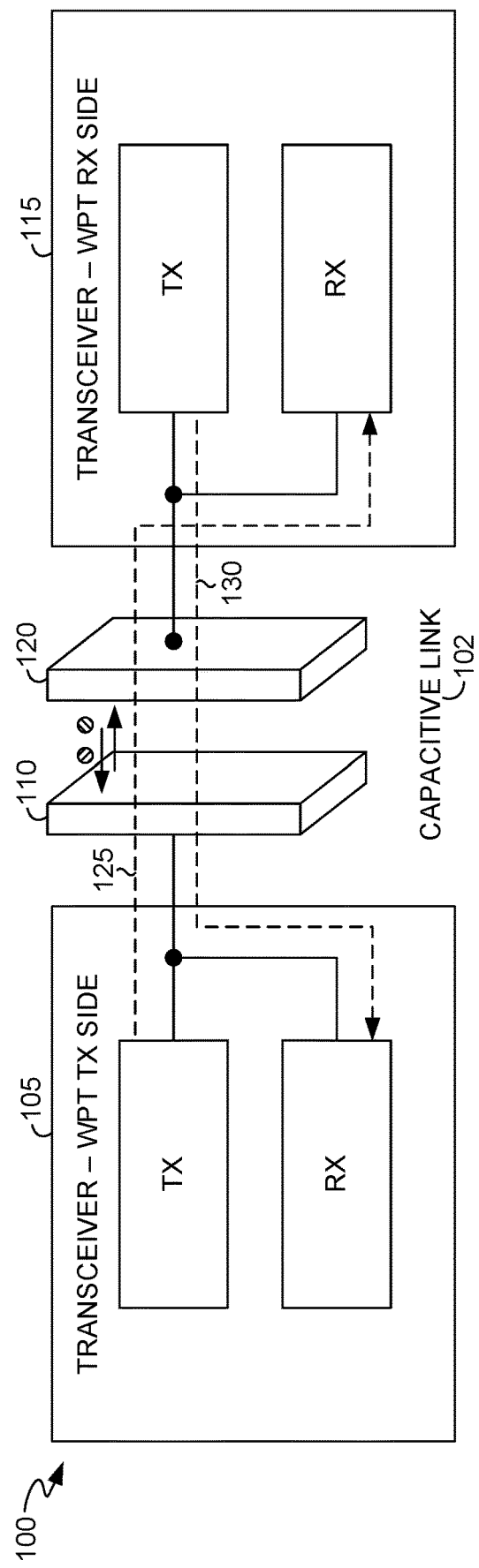
FIG. 1 is a schematic view of a capacitive half-duplex communication, implemented in accordance with an embodiment of the present disclosure.

In FIG. 1, a WPT system 100 is shown with embodiments of the present disclosure. A capacitive link 102 is formed by at least two electrodes. To perform a bi-directional communication, a transceiver 105 for a capacitive plate 110 and a transceiver 115 for a capacitive plate 120 is configured to stimulate capacitive plate 110 in the transmission phase, and to collect and convert the charge present on capacitive plate 120 in the reception phase. The communication flows (e.g., data transmission) are indicated by arrows 125 and 130.

Figure 2:
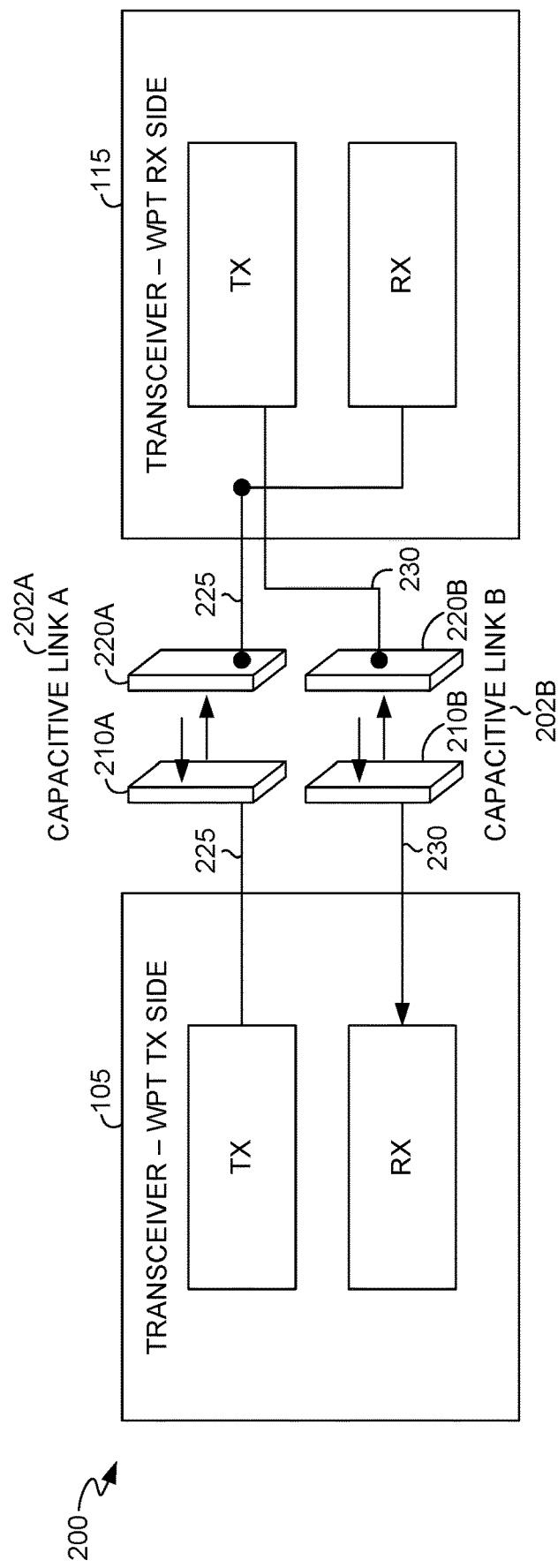
FIG. 2 is a schematic view of a capacitive full-duplex communication, implemented in accordance with an embodiment of the present disclosure.

Typically, only a half-duplex communication may be possible because two transceivers cannot transmit simultaneously. However, in FIG. 2, in WPT system 200, two capacitive structures (202A and 202B) are configured to perform a full-duplex communication. Capacitive plates 210A and 220A and capacitive plates 210B and 220B can perform a communication in one direction. For example, capacitive plates 210A and 220A can perform communication 225, and capacitive plates 210B and 220B can perform communication 230.

Figure 3:
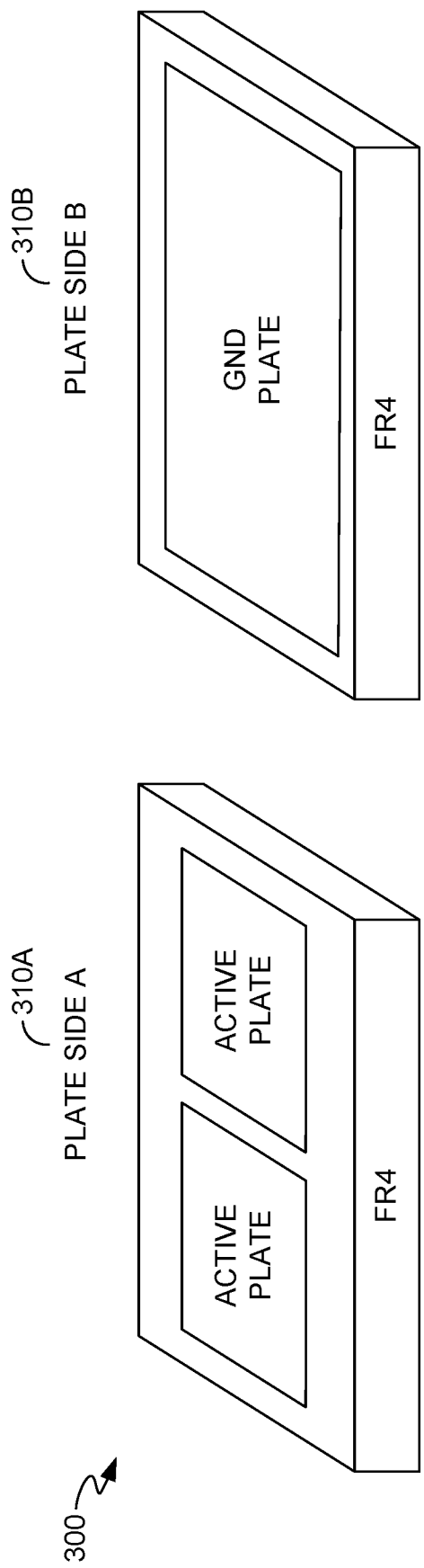
FIG. 3 is a view of a plate bipolar communication, implemented in accordance with an embodiment of the present disclosure.

In order to construct a full-duplex communication in a WPT system with capacitive links, a bipolar configuration may be provided as shown in FIG. 3. Plate bipolar configuration 300 has a capacitive plate with two plate sides 310A and 310B. For example, the capacitive plate on the left side of FIG. 3 shows plate side 310A, and the capacitive plate shown on the right is shows plate side 310B. Plate sides 310A and 310B form a single capacitive plate. In other words, the plate sides 310A, 310B shown in FIG. 3 may be understood as being opposite sides of the same capacitive plate. In embodiments, plate side 310A is an active plate side while plate side 310B is a ground (GND) plate side. Thus, plate side 310A may be referred to herein as the "active plate side" and plate side 310B may be referred to as the "ground plate side." Capacitive plates 110, 120 (FIG. 1), capacitive plates 210A, 220A, 210B, and 220B (FIG. 2), capacitive plates 410, 420 (FIG. 4), and capacitive plates 510, 520 (FIG. 5) may be formed as shown in FIG. 3.

With a pair of capacitive plates, the active plate side 310A of each capacitive plate can be placed facing each other to form a differential capacitive coupling structure. This structure has a resistance to noise because the ground plate side 310B introduces a boundary condition for the electric field.

In an exemplary embodiment of the present disclosure, the capacitive plates may be formed with metal plates (e.g., copper) with the dimensions of 6 mm by 2.3 mm and provided on a support made from a composite material, such as FR4. FR4 is a composite material that is flame retardant and made of a fiberglass and epoxy resin. The copper plates may be spaced about 15 mm with a plastics material used as a dielectric. The capacitance of the copper plates may be approximately 25 femto-Farads. However, the capacitance between active plate side and the ground plate side may be about 1-2 pico-Farads. As a result, the optimal way to drive the active plates is in differential mode, which creates an alternate electric field for each pair of facing plates.

Figure 4:
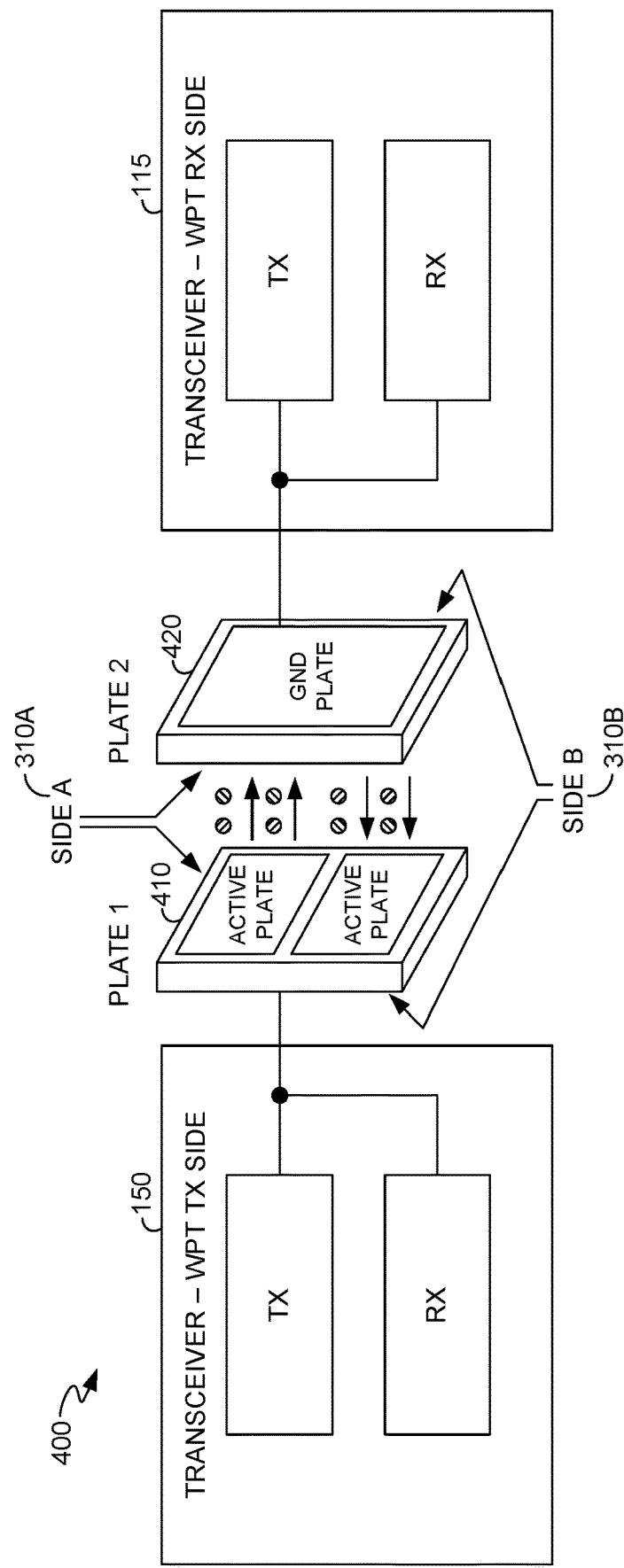
FIG. 4 is a schematic view of a capacitive communication with bipolar configuration, implemented in accordance with an embodiment of the present disclosure.

In FIG. 4, a WPT system 400 is shown with capacitive plates 410 and 420. Each of capacitive plates 410 and 420 implements the plate sides from FIG. 3. Capacitive plates 410 and 420 have an active plate side (310A) and a ground (GND) plate side (310B). As shown, bi-directional communications can occur between capacitive plates 410 and 420. Both capacitive plates 410 and 420 have at least two active plates sides on one side as shown as active plate side 310A. In embodiments, the upper active plate side shows a communication flow in one direction while the bottom active plate side shows a communication flow in an opposite direction. As one understands, only active plate side 310A is fully visible in plate 410. However, capacitive plate 420 has active plate side 310A as well, but is not visible in FIG. 4. Likewise, GND plate side 310B is fully visible in capacitive plate 420. However, capacitive plate 410 has GND plate side 310B as well, but is not visible in FIG. 4.

Figure 5:
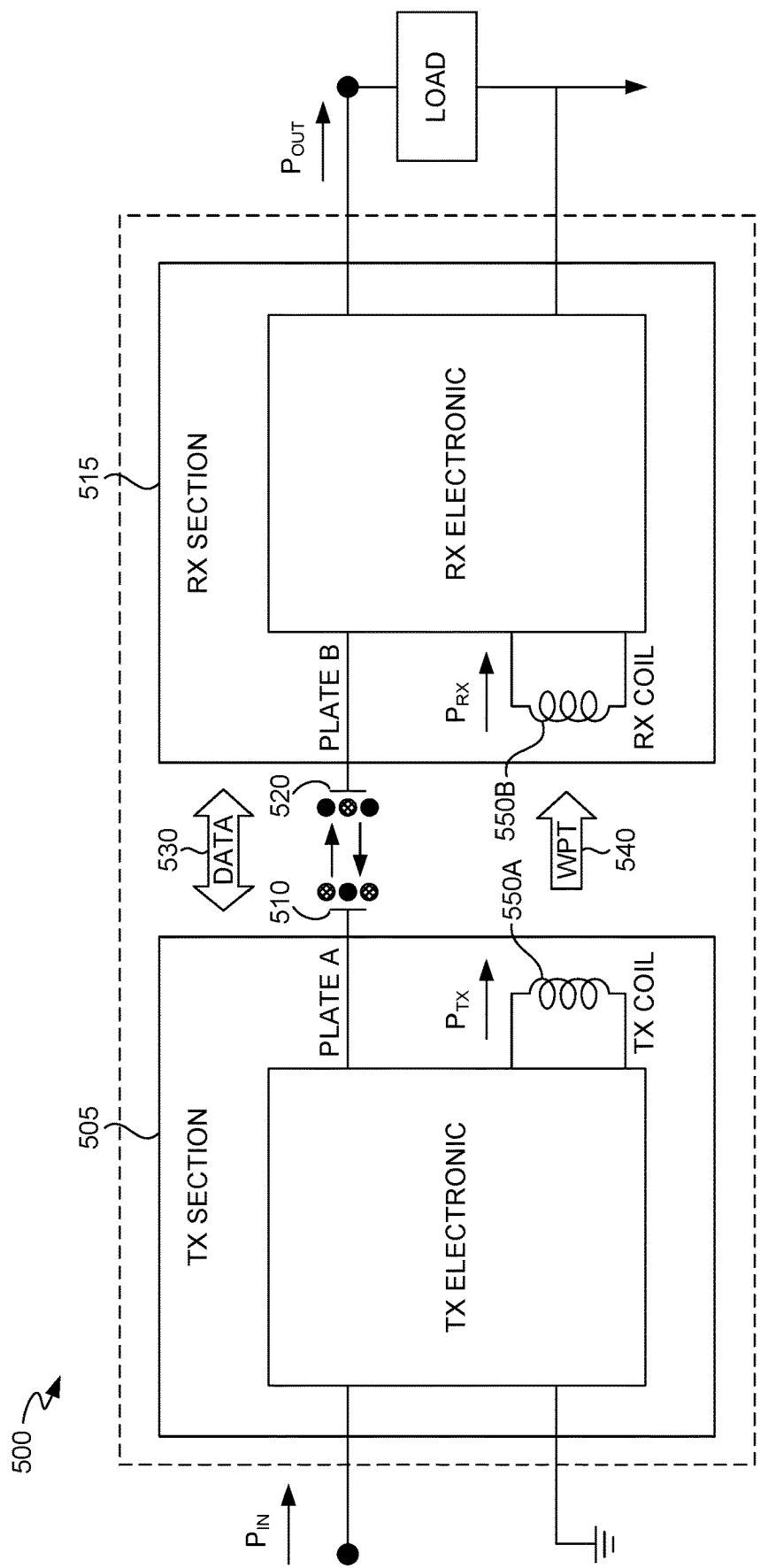
FIG. 5 is a schematic view of a power and data system architecture, implemented in accordance with an embodiment of the present disclosure.

Because the architecture is symmetric, the architecture may be simplified to consider the communication flow from first transceiver 505 to second transceiver 515, in FIG. 5. In contrast to FIG. 4, the architecture in FIG. 5 shows only one transmitter (TX) and one receiver (RX). Using the architecture in FIG. 5, a simulation can be performed where transceiver 505 has a 3.3 volt AC at 100 kHz source, which excites capacitive plate 510. This step is called the modulation stage. The source could be a dedicated driver or a microcontroller. With transceiver 515, a charge variation can be collected between capacitive plates 510 and 520. This charge variation is converted into an equivalent voltage variation. At this point, the demodulation stage occurs with transceiver 515. To design the demodulation stage in the simulation, the capacitance of an electrical model may be used that includes both plate-to-plate capacitance between capacitive plates 510 and 520 of around 25 femto-Farads and plate-to-ground capacitance in each plate of around 1 pico-Farad. The coupling second-order effects as plate-to-plate cross capacitance between capacitive plates 510 and 520 and plate-to-plate capacitance on the same side may not need to be considered.

With this simulation setup, a charge source model may produce a voltage variation of about 80 mV. To properly convert the charge, a charge amplifier converter can be used to work at 100 kHz. When executed, the simulation results are good in terms of shape and peak-to-peak amplitude. As a final step in the demodulation stage, an AC signal can be applied in a comparator with hysteresis to convert the analog signal to digital. In the performance of the simulation, the use of aluminum foil as a dielectric between capacitive plates 510 and 520 may yield the same results. The WPT system may be immune to metal objects.

Turning back to FIG. 5, WPT system 500 includes power 540 and data channel 530. Data channel 530 is illustrated as a short-range bi-directional communication channel occurring through capacitive coupling as evidenced by capacitive plates 510 and 520. Data channel 530 may be used to pair two sections, to provide software updates to a barcode reader, and/or to send information in case of foreign object detection (FOD).

In another embodiment of the present disclosure, WPT system 500 may be configured with capacitive plates 510 and 520 placed near wireless charging coils 550A and 550B that are configured to perform wireless power transfer through inductive coupling. This implementation illustrates that no interference may occur between the power transfer and the data communications despite the placement of capacitive plates 510 and 520 near coils 550A and 550B. The reason no interference may occur is because there are two different physical principles in action, power transfer in a magnetic field and capacitive coupling in an electrical field. As a result, an embodiment may be implemented that achieves space savings without loss of performance.

Figure 6:
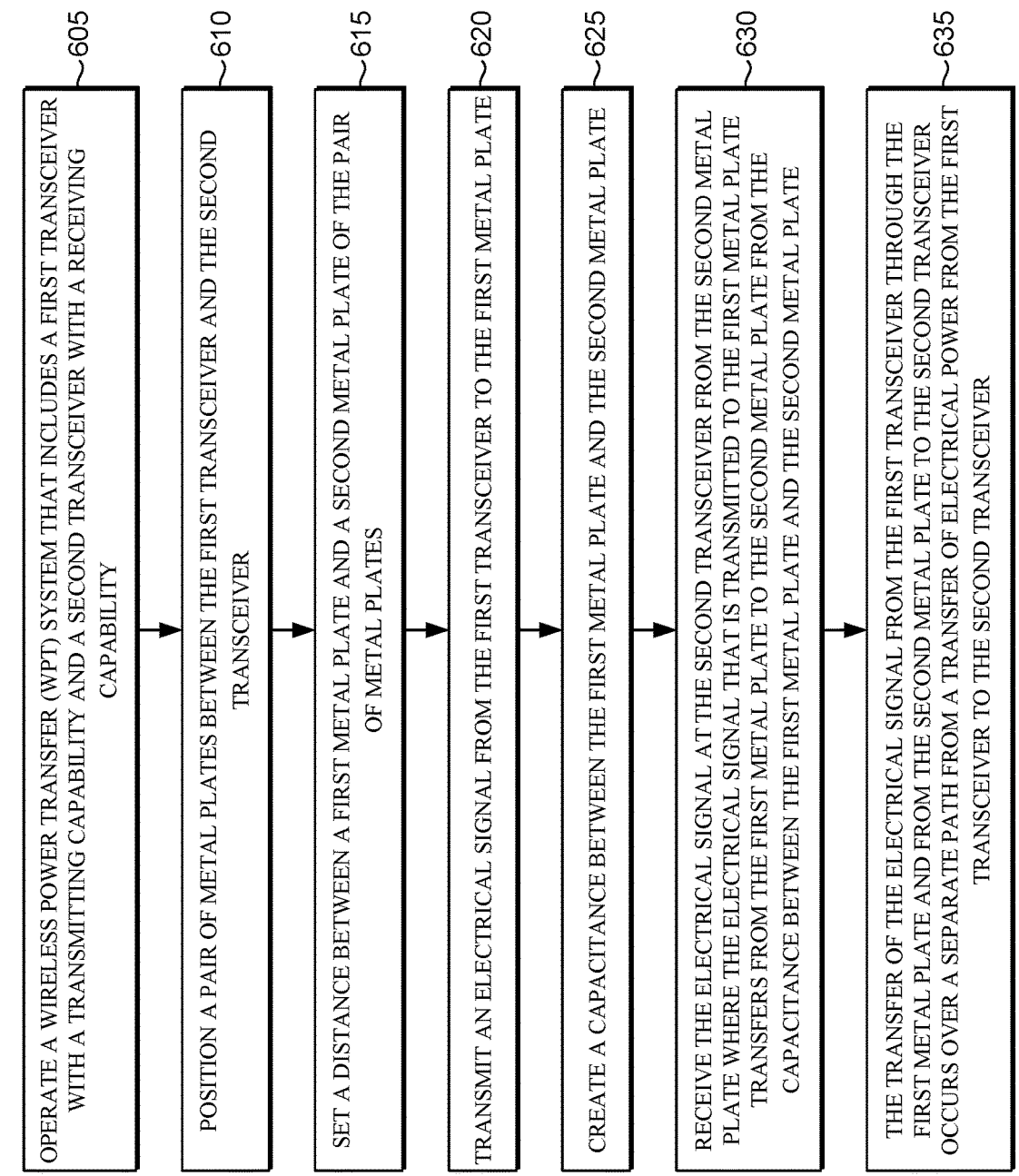
FIG. 6 is a process for bi-directional communication through capacitive coupling in a wireless charging device, implemented in accordance with an embodiment of the present disclosure.

Turning now to FIG. 6, a process for bi-directional communication through capacitive coupling in a wireless charging device is provided in a method 600. In a step 605, wireless power transfer (WPT) system 500 includes first transceiver 505 with a transmitting capability and second transceiver 515 with a receiving capability. In a step 610, capacitive plates 510 and 520 are positioned between first transceiver 505 and second transceiver 515. A distance is set between first capacitive plate 510 and second capacitive plate 520 of the pair of capacitive plates, in a step 615. In a step 620, an electrical signal is transmitted from first transceiver 505 to first capacitive plate 510. In a step 625, a capacitance is created between first capacitive plate 510 and second capacitive plate 520. The electrical signal is received at second transceiver 515 from second capacitive plate 520. where the electrical signal that is transmitted to first capacitive plate 510 transfers from first capacitive plate 510 to second capacitive plate 520 from the capacitance between first capacitive plate 510 and second capacitive plate 520, in a step 630. In a step 635, the transfer of the electrical signal from first transceiver 505 through first capacitive plate 510 and from second capacitive plate 520 to second transceiver 515 occurs over a separate path from a transfer of electrical power 540 from first transceiver 505 to second transceiver 515.

In conclusion, many different arrangements of the various components depicted, as well as components not shown, are possible without departing from the spirit and scope of embodiments of the present disclosure. Embodiments of the present disclosure have been described with the intent to be illustrative rather than restrictive. Certain features and sub-combinations are of utility and may be employed without reference to other features and sub-combinations and are contemplated to be within the scope of the claims.

What is claimed is:

1. A system of bi-directional communication through capacitive coupling in an inductive wireless charging device, comprising:
   a wireless power transfer (WPT) system including a first transceiver with a transmitting capability and a second transceiver with a receiving capability for electrical power and data communication;
   the WPT system including a first capacitive plate and a second capacitive plate positioned between the first transceiver and the second transceiver, wherein a distance exists between a first capacitive plate and a second capacitive plate of the pair of capacitive plates; and
   the first transceiver configured to transmit an electrical signal to the first capacitive plate causing the first capacitive plate and the second capacitive plate to have a capacitive coupling, and wherein the electrical signal is received at the second transceiver from the second capacitive plate,
   wherein a data transfer from the first transceiver through the first capacitive plate and from the second capacitive plate to the second transceiver occurs over a separate path from a transfer of the electrical power from the first transceiver to the second transceiver, and
   wherein the first transceiver and the first capacitive plate are located in the inductive wireless charging device that holds a barcode reader, and the second transceiver and the second capacitive plate are located in the barcode reader.

2. The system of claim 1, wherein the inductive wireless charging device is a cradle.

3. The system of claim 1, wherein the first capacitive plate and the corresponding second capacitive plate are configured for capacitive half-duplex communication.

4. The system of claim 1, wherein the first capacitive plate is configured to capacitively couple with the corresponding second capacitive plate to perform short-range data communication therebetween to achieve full-duplex communication.

5. The system of claim 1, wherein the data transfer is performed independent of the transfer of electrical power.

6. The system of claim 5, wherein the data transfer over a communication channel includes providing software updates to the barcode reader.

7. The system of claim 5, wherein the data transfer over a communication channel is used for pairing.

8. A system of bi-directional communication through capacitive coupling in an inductive wireless charging device, comprising:
   a wireless power transfer (WPT) system including a first transceiver with a transmitting capability and a second transceiver with a receiving capability for electrical power and data communication;
   the WPT system including a first capacitive plate and a second capacitive plate positioned between the first transceiver and the second transceiver, wherein a distance exists between a first capacitive plate and a second capacitive plate of the pair of capacitive plates; and the first transceiver configured to transmit an electrical signal to the first capacitive plate causing the first capacitive plate and the second capacitive plate to have a capacitive coupling, and wherein the electrical signal is received at the second transceiver from the second capacitive plate, wherein a data transfer from the first transceiver through the first capacitive plate and from the second capacitive plate to the second transceiver occurs over a separate path from a transfer of the electrical power from the first transceiver to the second transceiver, and wherein each of the first capacitive plate and the second capacitive plate have an active plate side and a ground plate side, and wherein the active plate side of the first capacitive plate and the active plate side of the second capacitive plate are faced toward each other to form a differential capacitive coupling.

9. The system of claim 8, wherein the each of the first capacitive plate and the second capacitive plate include one or more metal plates disposed on a support formed from a composite material.

10. The system of claim 8, wherein the metal plates include two active plates on the active plate side, and a single ground plate on the ground plate side for each of the first capacitive plate and the second capacitive plate.

11. The system of claim 10, wherein the two active plates are driven in differential mode to create an alternate electric field for each pair of facing plates.

12. The system of claim 8, wherein the first transceiver includes both the transmitting capability and the receiving capability for data communication through the first and second capacitive plates, and the second transceiver includes both the receiving capability and the transmitting capability for data communication through the first and second capacitive plates.

13. The system of claim 12, wherein a bi-directional communication occurs with data transferring from the first transceiver through the first capacitive plate to the second capacitive plate and from the second capacitive plate to the second transceiver in one direction and the data transferring from the second transceiver through the second capacitive plate to the first capacitive plate and from the first capacitive plate to the first transceiver in another direction.

14. A system of bi-directional communication through capacitive coupling in an inductive wireless charging device, comprising:
a wireless power transfer (WPT) system including a first transceiver with a transmitting capability and a second transceiver with a receiving capability for electrical power and data communication;
the WPT system including a first capacitive plate and a second capacitive plate positioned between the first transceiver and the second transceiver, wherein a distance exists between a first capacitive plate and a second capacitive plate of the pair of capacitive plates; and
the first transceiver configured to transmit an electrical signal to the first capacitive plate causing the first capacitive plate and the second capacitive plate to have a capacitive coupling, and wherein the electrical signal is received at the second transceiver from the second capacitive plate,
wherein a data transfer from the first transceiver through the first capacitive plate and from the second capacitive plate to the second transceiver occurs over a separate path from a transfer of the electrical power from the first transceiver to the second transceiver,
wherein the first capacitive plate and the corresponding second capacitive plate each have a bipolar configuration.

15. A method for bi-directional communication through capacitive coupling in a wireless charging device, comprising:
operating a wireless power transfer (WPT) system that includes a first transceiver with a transmitting capability and a second transceiver with a receiving capability for electrical power and data communication;
positioning a pair of capacitive plates between the first transceiver and the second transceiver, wherein a distance exits between a first capacitive plate and a second capacitive plate of the pair of capacitive plates;
transmitting an electrical signal from the first transceiver to the first capacitive plate, wherein transmitting the electrical signal comprises creating a capacitance between the first capacitive plate and the second capacitive plate; and
receiving the electrical signal at the second transceiver from the second capacitive plate, wherein the electrical signal transmitted to the first capacitive plate transfers from the first capacitive plate to the second capacitive plate from the capacitance between the first capacitive plate and the second capacitive plate,
wherein transferring the electrical signal from the first transceiver through the first capacitive plate and from the second capacitive plate to the second transceiver occurs over a separate path from transferring the electrical power from the first transceiver to the second transceiver, and
positioning the first transceiver and the first capacitive plate in the wireless charging device that holds a barcode reader, and positioning the second transceiver and the second capacitive plate in the barcode reader.

16. The method of claim 15, further comprising transferring data from the first transceiver to the second transceiver through the electrical signal that passes from the first transceiver through the first capacitive plate and the second capacitive plate to the second transceiver.

17. The method of claim 15, wherein the first transceiver has both the transmitting capability and the receiving capability for data communication through the first and second capacitive plates, and the second transceiver has both the receiving capability and the transmitting capability for data communication through the first and second capacitive plates.

18. The method of claim 17, further comprising implementing a bi-directional communication with data transferring from the first transceiver through the first capacitive plate to the second capacitive plate and from the second capacitive plate to the second transceiver in one direction and data transferring from the second transceiver through the second capacitive plate to the first capacitive plate and from the first capacitive plate to the first transceiver in another direction.

19. A method for bi-directional communication through capacitive coupling in a wireless charging device, comprising:
operating a wireless power transfer (WPT) system that includes a first transceiver with a transmitting capability and a second transceiver with a receiving capability for electrical power and data communication;
positioning a pair of capacitive plates between the first transceiver and the second transceiver, wherein a distance exits between a first capacitive plate and a second capacitive plate of the pair of capacitive plates;

transmitting an electrical signal from the first transceiver to the first capacitive plate, wherein transmitting the electrical signal comprises creating a capacitance between the first capacitive plate and the second capacitive plate; and receiving the electrical signal at the second transceiver from the second capacitive plate, wherein the electrical signal transmitted to the first capacitive plate transfers from the first capacitive plate to the second capacitive plate from the capacitance between the first capacitive plate and the second capacitive plate, wherein transferring the electrical signal from the first transceiver through the first capacitive plate and from the second capacitive plate to the second transceiver occurs over a separate path from transferring the electrical power from the first transceiver to the second transceiver, and wherein each of the first capacitive plate and the second capacitive plate have an active plate side and a ground plate side, and facing the active plate side of the first capacitive plate and the active plate side of the second capacitive plate toward each other to form a differential capacitive coupling.

20. The method of claim 19, further comprising forming the first capacitive plate and the second capacitive plate by coupling one or more metal plates on a support formed from a composite material.

* * * * *